(12) United States Patent
Polonowski et al.

(10) Patent No.: US 10,508,615 B2
(45) Date of Patent: Dec. 17, 2019

(54) ENGINE WITH A PISTON HEATING SYSTEM AND METHOD FOR OPERATION THEREOF

(71) Applicant: Ford Global Technologies, LLC, Dearborn, MI (US)

(72) Inventors: Christopher Polonowski, Belleville, MI (US); Eric Matthew Kurtz, Dearborn, MI (US); Daniel William Kantrow, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 15/798,208

(22) Filed: Oct. 30, 2017

(65) Prior Publication Data
US 2019/0128212 A1    May 2, 2019

(51) Int. Cl.
| | |
|---|---|
| *F02F 3/02* | (2006.01) |
| *F01M 1/08* | (2006.01) |
| *F01M 5/00* | (2006.01) |
| *F02D 15/00* | (2006.01) |
| *F02D 41/14* | (2006.01) |
| *F02D 41/40* | (2006.01) |
| *F02P 5/152* | (2006.01) |

(52) U.S. Cl.
CPC ............ *F02F 3/02* (2013.01); *F01M 1/08* (2013.01); *F01M 5/001* (2013.01); *F02D 15/00* (2013.01); *F02D 41/1443* (2013.01); *F02D 41/403* (2013.01); *F02P 5/1522* (2013.01); *F02D 2200/023* (2013.01); *F02D 2200/024* (2013.01); *F02D 2200/025* (2013.01)

(58) Field of Classification Search
CPC .. F02F 3/02; F01M 5/001; F01M 1/08; F02D 15/00; F02D 41/1443; F02D 41/403; F02D 2200/023; F02D 2200/024; F02D 2200/025; F02P 5/1522
See application file for complete search history.

(56) References Cited

U.S. PATENT DOCUMENTS

| | | | |
|---|---|---|---|
| 3,336,746 A | 8/1967 | Southwick | |
| 4,013,047 A * | 3/1977 | Harned | F01P 9/00 |
| | | | 123/41.2 |
| 4,493,292 A * | 1/1985 | Showalter | F02F 3/18 |
| | | | 123/193.6 |
| 5,477,820 A | 12/1995 | Rao | |
| (Continued) | | | |

FOREIGN PATENT DOCUMENTS

| | | |
|---|---|---|
| DE | 102009013323 A1 | 9/2010 |
| WO | 2004048761 A1 | 6/2004 |

*Primary Examiner* — Joseph J Dallo
*Assistant Examiner* — Kurt Philip Liethen
(74) *Attorney, Agent, or Firm* — Geoffrey Brumbaugh; McCoy Russell LLP

(57) ABSTRACT

Methods and systems are provided for actively heating pistons in combustion chambers to decrease a torque imbalance in an engine. In one example, a method for operation of an engine includes determining a variation between compression ratios in a first combustion chamber and a second combustion chamber and operating a piston heating system to apply a targeted amount of heat to a first piston assembly based on the variation between the compression ratios, the first piston assembly including a first piston positioned within the first combustion chamber.

20 Claims, 6 Drawing Sheets

(56) References Cited

U.S. PATENT DOCUMENTS

| | | | |
|---|---|---|---|
| 5,546,908 A | 8/1996 | Stokes | |
| 7,603,977 B2* | 10/2009 | Heidrich | F02F 3/22 |
| | | | 123/193.6 |
| 7,827,943 B2 | 11/2010 | Cannata | |
| 8,408,166 B1* | 4/2013 | Zhou | F01P 3/08 |
| | | | 123/196 R |
| 2007/0227347 A1* | 10/2007 | Tinker | F01B 13/061 |
| | | | 91/508 |
| 2009/0205615 A1 | 8/2009 | Cannata | |
| 2013/0167797 A1* | 7/2013 | Svrcek | F16J 1/09 |
| | | | 123/193.4 |

* cited by examiner

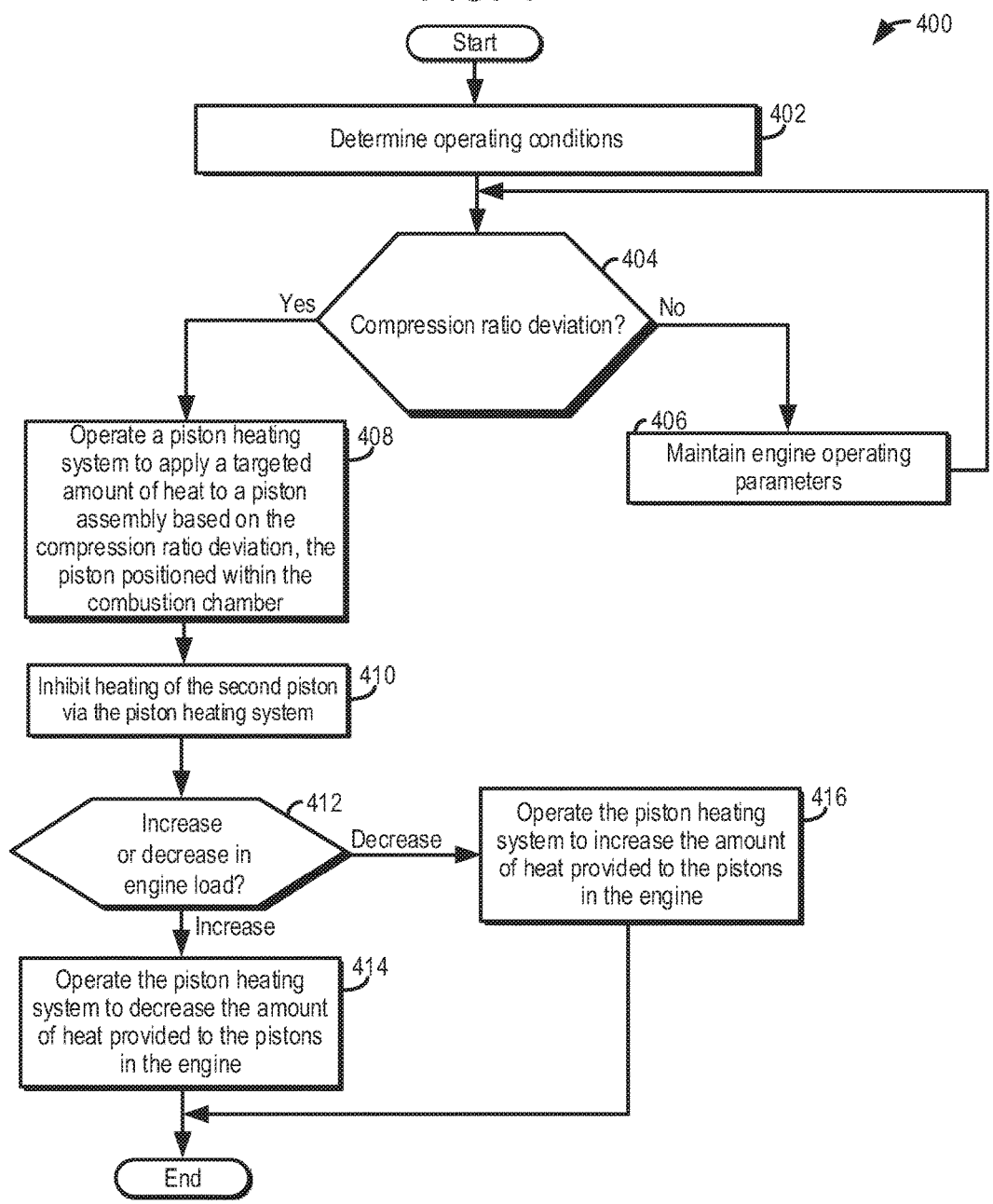

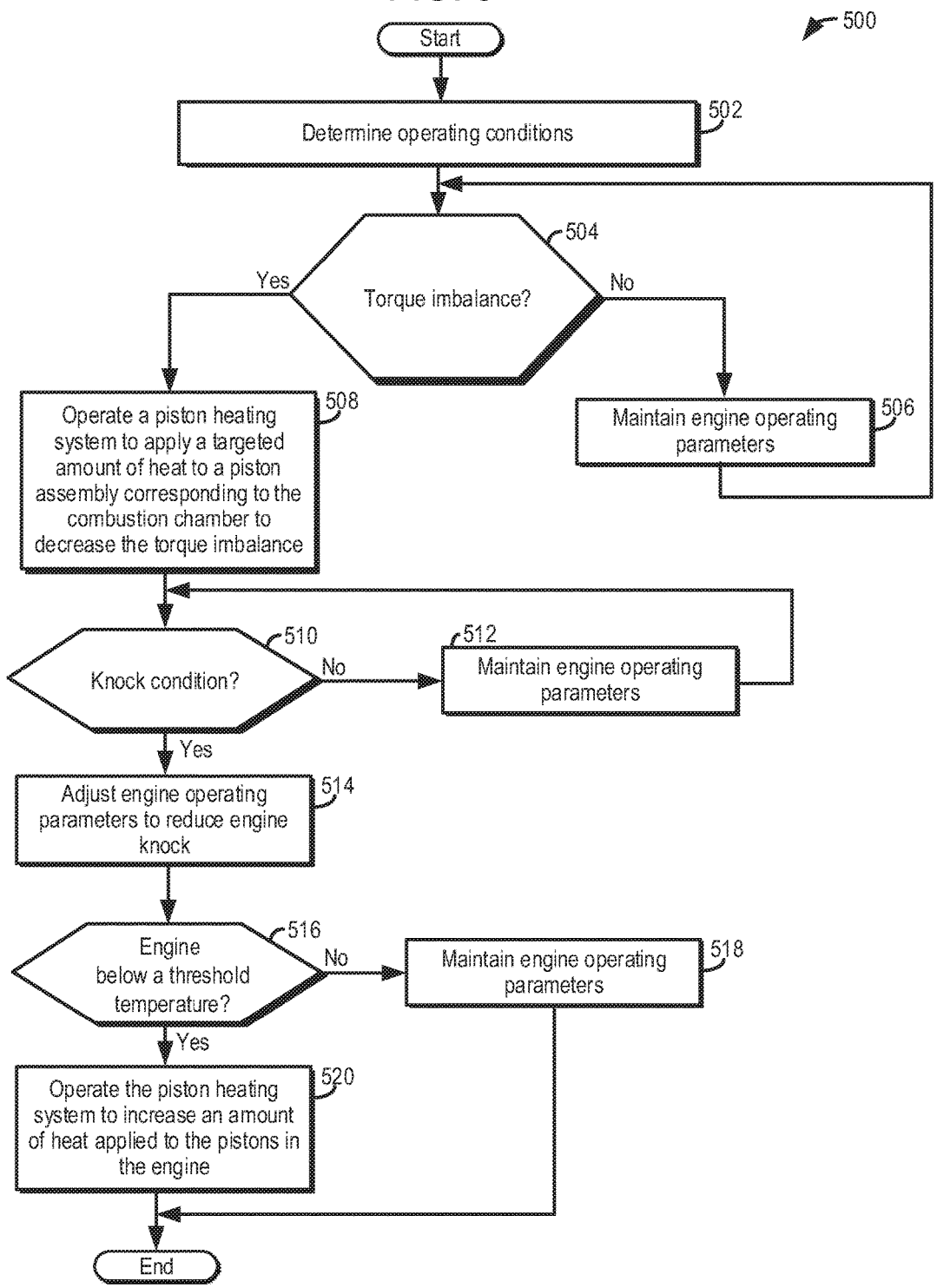

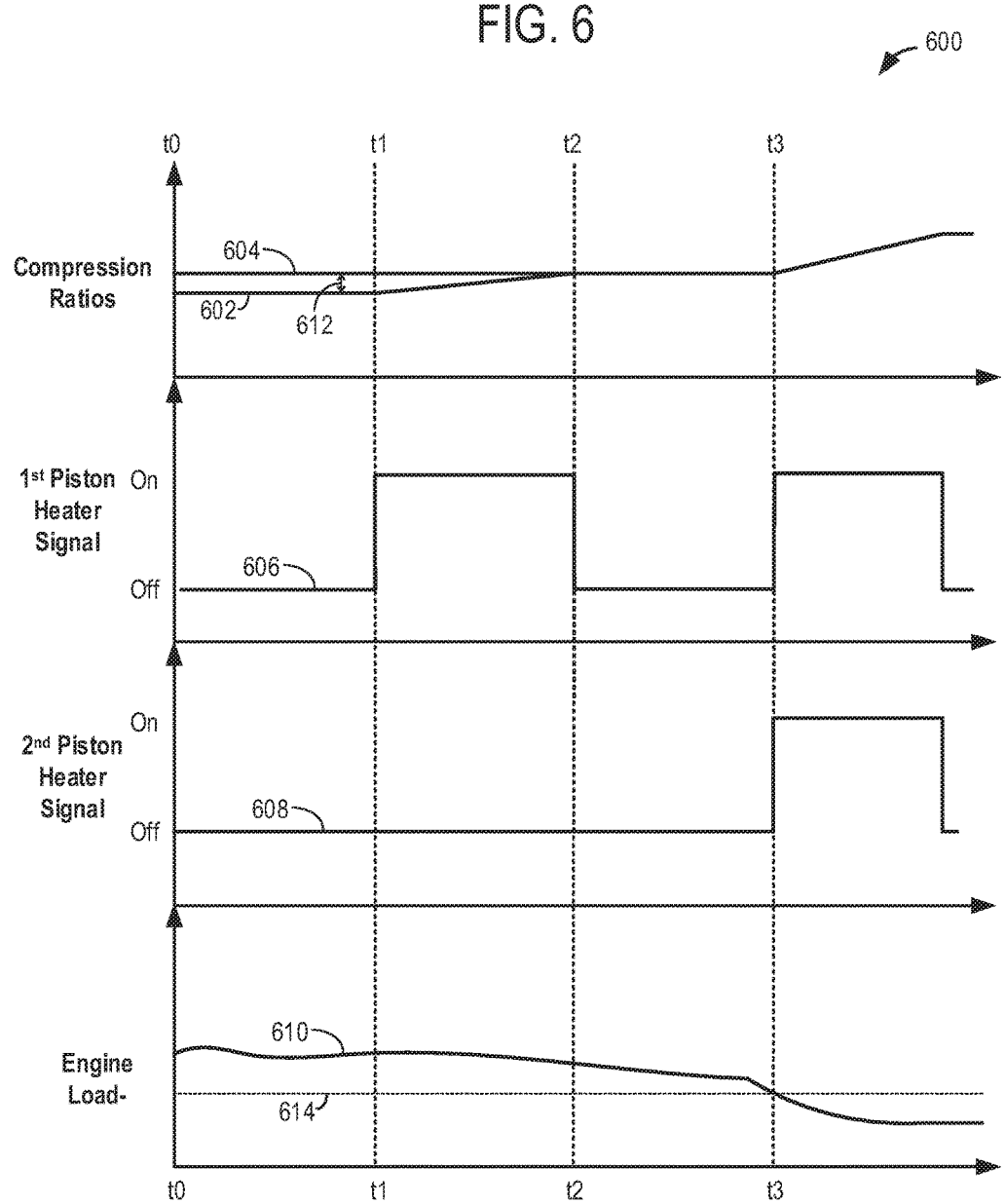

ENGINE WITH A PISTON HEATING SYSTEM AND METHOD FOR OPERATION THEREOF

FIELD

The present description relates generally to an engine with a piston heating system designed to adjust compression ratios in combustion chambers in an engine and a method operation of an engine with a piston heating system.

BACKGROUND/SUMMARY

Variations in cylinder compression ratios may arise in engines due to the manufacturing tolerances of different components as well as stack-up tolerances in groups of components. For instance, the tolerances in components influencing piston squish height and bowl volume can cause variations in cylinder compression in multi-cylinder engines. Often the compression ratio can vary cylinder to cylinder by +/−1.0%, for instance, which can cause variations in the power produced by each cylinder. Consequently, the power and fuel consumption of the engine may be reduced and the drivability of a vehicle in which the engine resides may be negatively affected. These problems may be particularly prevalent in compression ignition engines. However, variations in compressions ratios can also have negative impacts on spark-ignition engines.

One example approach shown by Cannata, in U.S. Pat. No. 7,827,943 B2, includes a system that varies a compression ratio in a cylinder via a mechanical assembly that adjusts the position where the connecting rod and the piston are attached. However, Cannata's system achieves compression ratio adaptability at the expense of engine reliability. For example, Cannata's mechanical compression ratio adjustment system may be prone to malfunction and failure due to the complexity of the mechanical components used to adjust the compression ratios.

The inventors have recognized the aforementioned problems with previous engines and facing these challenges developed a method for operation of an engine, in one example, to address the problems. The method includes determining a variation between compression ratios in a first combustion chamber and a second combustion chamber and operating a piston heating system to apply a targeted amount of heat to a first piston assembly based on the variation between the compression ratios, the first piston assembly including a first piston positioned within the first combustion chamber. In this way, the compression ratio of each cylinder may be adjusted to reduce variations between the compression ratios in the engine and stabilize the amount of torque produced by the cylinders, if desired, through a robust and reliable compression ratio adjustment system. Consequently, engine efficiency can be increased while reducing noise, vibration, and harshness (NVH) caused by the torque imbalance. Such compression ratio adjustment is also carried out using a dependable system that is not prone to malfunction. As a result, the drivability as well as the reliability of the vehicle may be increased, thereby increasing customer satisfaction.

In one example, operating the piston heating system may include activating a heater coupled to a lubrication line, the lubrication line including a nozzle directing lubricant to a first piston rod coupled to the first piston and a crankshaft during engine operation. In this way, a piston assembly heater can be incorporated into a lubrication system to induce compression ratio adjustment in an efficient and reliable manner.

In another example, the amount of heat delivered to combustion chambers in the engine may be varied based on engine load. In such an example, during low load conditions (e.g., when the engine load is below a predetermined threshold value) piston assembly heaters coupled to the first and second combustion chambers may be activated or operated to increase an amount of heat delivered to the combustion chambers to increase the compression ratios in the combustion chambers. Consequently, the piston heating system can also be used to increase combustion efficiency in the engine during low load conditions, for instance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a method for operation of an internal combustion engine and piston heating system.

FIG. 5 shows another method for operation of an internal combustion engine and piston heating system.

FIG. 6 shows a timing diagram of an exemplary piston heating system control strategy.

DETAILED DESCRIPTION

The following description relates to a piston heating system and a method for operating the piston heating system to adjust the compression ratio in one or more combustion chambers in an engine. The piston heating system includes piston assembly heaters providing independent targeted heating to engine piston assemblies (e.g., pistons and piston rods), enabling the compression ratio of associated combustion chambers to be varied. As defined herein, a compression ratio is a value that represents a ratio of the volume a combustion chamber from its largest capacity to its smallest capacity. It will be appreciated that heating or cooling of the piston assembly can increase or decrease the compression ratio of the combustion chamber due to the material properties of the piston, piston rod, cylinder block, and cylinder head. Specifically, temperature affects the piston volumetrically. If the piston is heated isothermally, the volumetric shape of the piston expands in all directions. However, in real engines, the piston temperature is not isothermal, so the expansion along any axis X (width, height, radius) may vary as a function of $C_{exp}=dT/dX$, where $C_{exp}$ is the thermal expansion coefficient for the piston material. When a variance in compression ratios is ascertained, from pressure or proximity sensors signals for instance, the piston assembly (e.g., piston and piston rod) corresponding to the combustion chamber with the smaller compression ratio may be heated to reduce the compression ratio variance. Consequently, engine efficiency can be increased while reducing noise, vibration, and harshness (NVH) in the engine. Moreover, it will be appreciated that the piston heating system is more reliable than previous mechanical systems for adjusting cylinder compression ratios. Additionally, the piston heating system may also be designed to heat the pistons and/or piston rods during low load and cold start conditions to further increase engine efficiency.

Figure 1:
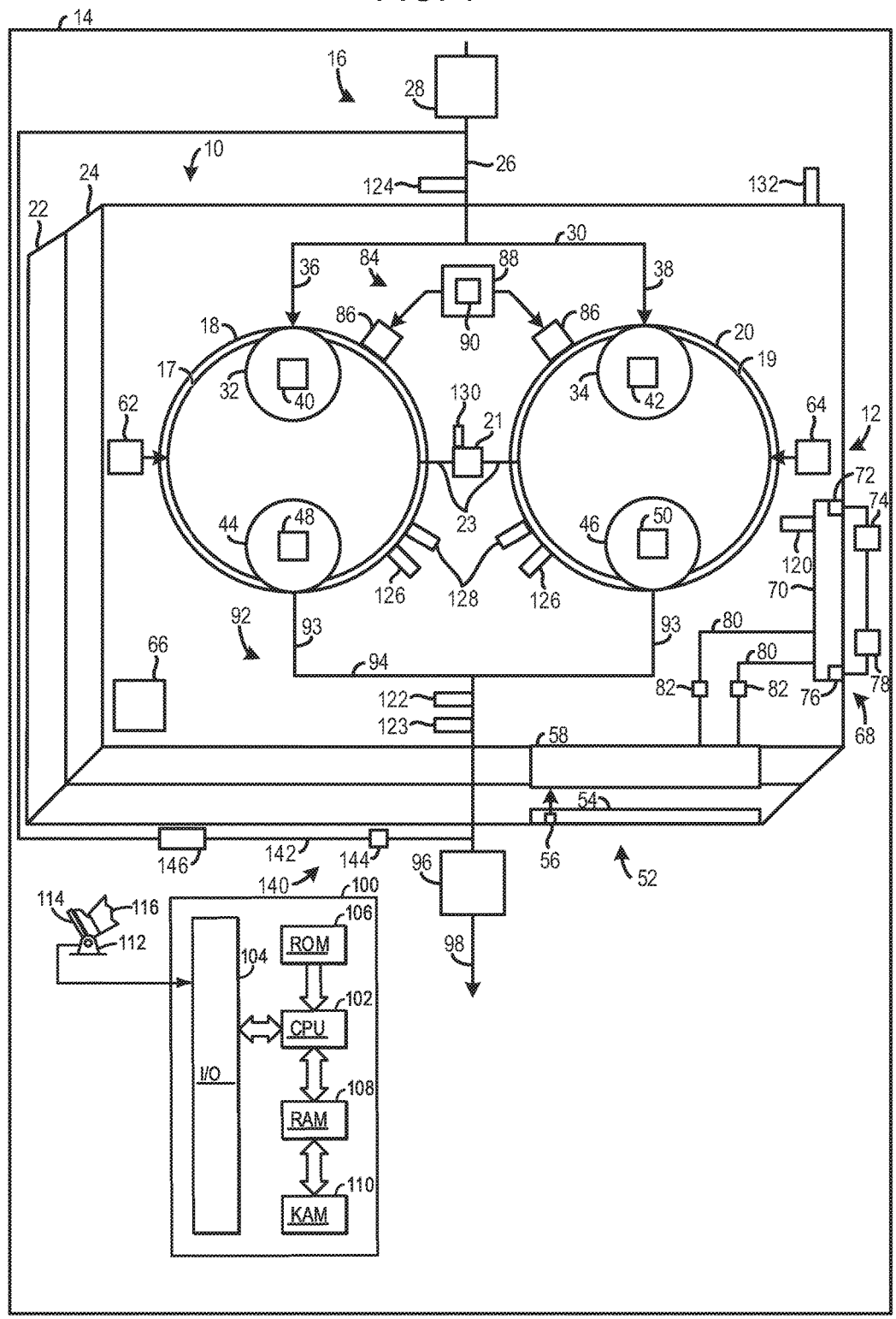
FIG. 1 shows a schematic depiction of an internal combustion engine including a piston heating system.
Figure 2:
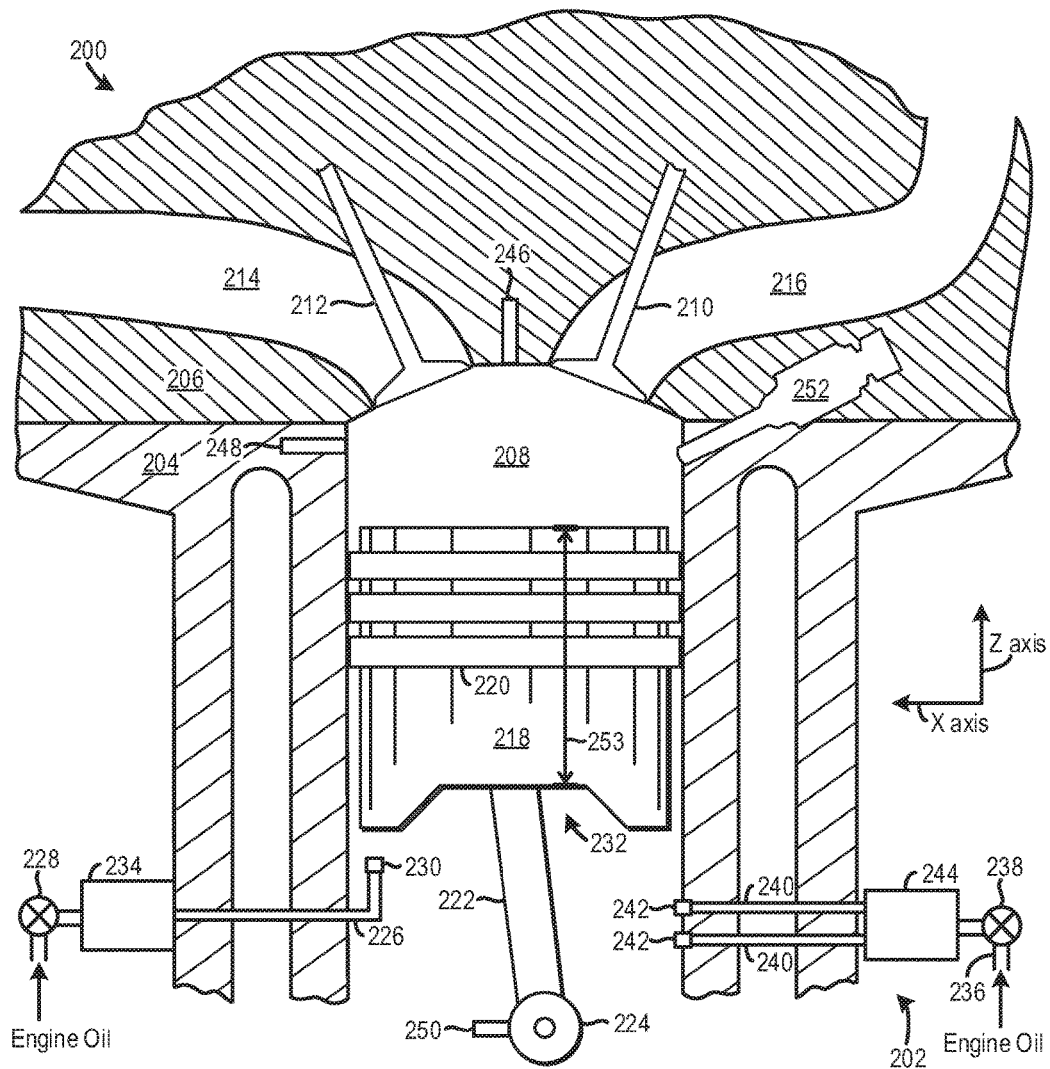
FIG. 2 shows an illustration of a cross-section of a first example of the engine and piston heating system, shown in FIG. 1.
Figure 3:
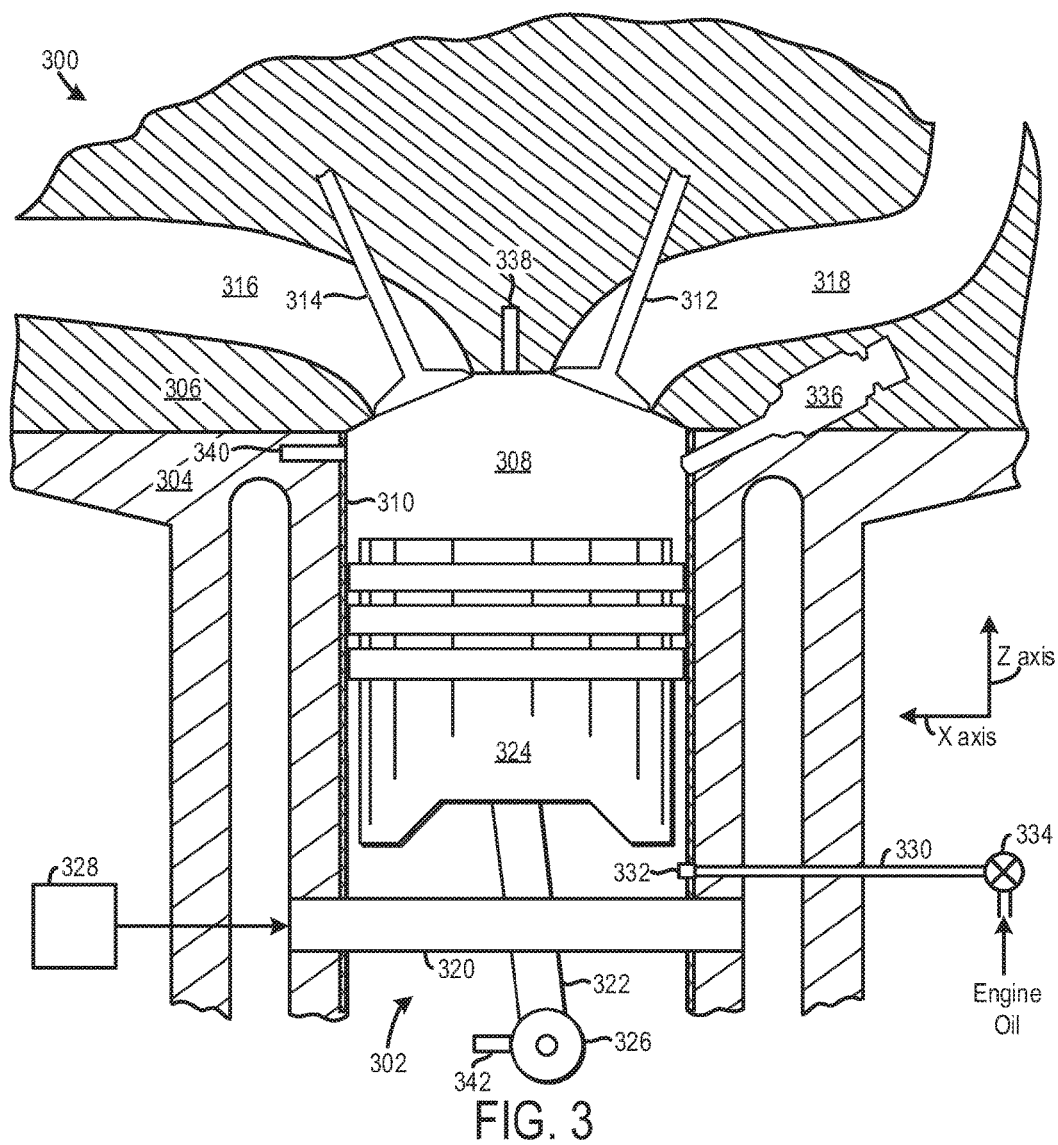
FIG. 3 shows an illustration of a cross-section of a second example of the engine and piston heating system, shown in FIG. 1.

FIG. 1 shows a schematic depiction of an engine employing a piston heating system designed to vary combustion chamber compression ratios in the engine. FIG. 2 shows a first example of a piston heating system with lubricant heaters. FIG. 3 shows a second example of a piston heating system with an induction heater. FIGS. 4 and 5 show methods for operation of engines and piston heating systems to adjust compression ratios in the engine. FIG. 6 shows a timing diagram of an exemplary piston heating system control strategy for reducing torque imbalances in an engine as well as increasing engine efficiency.

Turning to FIG. 1, an engine 10 with a piston heating system 12 in a vehicle 14 is schematically illustrated. Although, FIG. 1 provides a schematic depiction of various engine and piston heating system components, it will be appreciated that at least some of the components may have a different spatial positions and greater structural complexity than the components shown in FIG. 1. The structural details of the components are discussed in greater detail herein with regard to FIGS. 2-3.

An intake system 16 providing intake air to a first combustion chamber 18 and a second combustion chamber 20, is also depicted in FIG. 1. A first piston 17 is positioned in the first combustion chamber 18 and a second piston 19 is positioned in the second combustion chamber 20. The pistons 17 and 19 are coupled to a crankshaft 21 via mechanical components 23 (e.g., piston rods). Each pair of pistons and associated mechanical components (e.g., piston rods) may be referred to as a piston assembly. The combustion chambers, 18 and 20, are formed by a cylinder block 22 coupled to a cylinder head 24. Although, FIG. 1 depicts the engine 10 with two combustion chambers. The engine 10 may have an alternate number of combustion chambers, in other examples. For instance, the engine 10 may include a single combustion chamber, three combustion chambers, six combustion chambers, eight combustion chambers, etc., in other examples. Moreover, the combustion chambers may be arranged in different banks, in some examples. For instance, the first combustion chamber 18 may be arranged in a first cylinder bank while the second combustion chamber 20 may be arranged in a second cylinder bank.

The intake system 16 includes an intake conduit 26 and a throttle 28 coupled to the intake conduit. The throttle 28 is configured to regulate the amount of airflow provided to the combustion chambers, 18 and 20. In the depicted example, the intake conduit 26 feeds air to an intake manifold 30. In turn, the intake manifold 30 directs air to a first intake valve 32 and a second intake valve 34 via a first intake runner 36 and a second intake runner 38, respectively. However, in other examples, such as in the case of a single-cylinder engine, the intake conduit 26 may route intake air directly to an intake valve in one combustion chamber.

The intake valves 32 and 34 may be actuated by intake valve actuators, 40 and 42, respectively. Likewise, exhaust valves, 44 and 46, may be actuated by exhaust valve actuators 48 and 50, respectively. In one example, the intake valve actuators 40 and 42 and the exhaust valve actuators 48 and 50 may employ cams coupled to intake and exhaust camshafts (not shown), respectively, to open/close the valves. Continuing with the cam driven valve actuator example, the intake and exhaust camshafts may be rotationally coupled to a crankshaft. Further in such an example, the valve actuators may utilize one or more of cam profile switching (CPS), variable cam timing (VCT), variable valve timing (VVT), and/or variable valve lift (VVL) systems to vary valve operation. Thus, cam timing devices may be used to vary the valve timing, if desired. It will therefore be appreciated that valve overlap may occur. In another example, the intake and/or exhaust valve actuators, 40, 42, 48, and 50, may be controlled by electronic valve actuation. For example, the valve actuators, 40, 42, 48, and 50, may be electronic valve actuators controlled via electronic actuation. In yet another example, the engine 10 may alternatively include exhaust valves controlled via electric valve actuation and intake valves controlled via cam actuation including CPS and/or VCT systems or vice versa. In still other embodiments, the intake and exhaust valves may be controlled by a common valve actuator or actuation system.

The engine 10 further includes a lubrication system 52 providing lubricant to engine components such as the pistons, 17 and 19, crankshaft 21, mechanical components 23, etc. The lubrication system 52 includes a lubricant reservoir 54 that receiving lubricant from the lubricated components (e.g., pistons, crankshaft, piston rods, etc.). Thus, the lubricant reservoir 54 in the lubrication system 52 may be designed to receive drain oil from the lubricated components such as the pistons 17 and 19, crankshaft 21, mechanical components 23, etc. For instance, the lubricant reservoir 54 may be positioned below the lubricated components to receive oil that has been sprayed or otherwise delivered to the lubricated components. A lubricant pump 56 is positioned in the lubricant reservoir 54 in the illustrated example. However, in other examples, the lubricant pump 56 may be positioned external to the lubricant reservoir with a pick-up line extending into the reservoir. The lubricant pump 56 is configured to flow pressurized lubricant to a plurality of lubrication lines 58. The plurality of lubrication lines 58 are schematically illustrated. However it will be appreciated that the lubrication lines may extend through different sections of the cylinder block 22 and/or cylinder head 24 to provide lubricant to the pistons, 17 and 19, the crankshaft 21, mechanical components 23, etc. The lubrication system 52 may further include nozzles designed to spray or otherwise direct lubricant to the pistons, crankshaft, etc., and are discussed in greater detail herein with regard to FIGS. 2 and 3. The lubrication system 52 also includes valves that are designed to regulate the flowrate of the lubricant provided to the lubricated components, discussed in greater detail herein with regard to FIGS. 2 and 3.

The piston heating system 12 includes a first piston assembly heater 62 coupled to the first combustion chamber 18 and a second piston assembly heater 64 coupled to the second combustion chamber 20. The piston assembly heaters, 62 and 64, are configured to provide varied amounts of heat to the pistons, 17 and 19. Varying the amount of heat provided to the pistons enables the compression ratios in the combustion chambers to be adjusted. In this way, the compression ratios in specific cylinders may be tuned to reduce torque imbalances in the engine as well as increase combustion efficiency in the engine 10. Control strategies used to vary the compression ratios in the engine are discussed in greater detail herein. The first piston assembly heater 62 and/or the second piston assembly heater 64 may be electrical heaters designed to heat lubricant directed to the first piston 17, the second piston 19, and/or the mechanical components 23 (e.g., piston rods) connected to the pistons, in one example. In such an example, an energy storage device 66 may deliver electrical power to the first piston assembly heater 62 and the second piston assembly heater 64. However, in other examples, the first piston assembly heater 62 and/or the second piston assembly heater 64 may be induction heaters designed to provide targeted amounts of heat to the first piston 17, the second piston 19, and/or the mechanical components 23 (e.g., piston rods) via induction heating. Specifically, the induction heaters may be designed to heat piston rods when the rods drop below a combustion chamber liner, in one example. Further in other examples, the first piston assembly heater 62 and/or the second piston assembly heater 64 may include a heat exchanger configured to transfer heat from engine coolant to lubricant that is delivered to the first piston 17, the second piston 19, and/or mechanical components 23 (e.g., piston rods) coupled to the pistons and the crankshaft 21. In this way, excess heat in the engine cooling system may be transferred to the piston heating system, to increase engine efficiency. Other types of piston assembly heaters that may be used in the piston heating system include electrical heating elements, heat pump devices, a coolant to oil heat exchanger, etc. It will be appreciated that heating of the piston assemblies (e.g., pistons and/or piston rods) allows the pistons and/or piston rods to thermally expand to increase the combustion ratio of the corresponding combustion chamber. The thermal expansion of the pistons and piston rods may be proportional to their vertical length. In some examples, the piston rods may be taller (e.g., three times taller) than the piston. Therefore, heating the piston rod may have a significant impact on the compression ratio growth.

The piston heating system 12 may be designed to vary the heating delivered to targeted pistons and/or piston rods to decrease compression ratio variances in the engine 10. By decreasing compression ratio variance NVH in the engine decrease while combustion efficiency is increased. For instance, if it is determined that one of the combustion chambers has a smaller compression ratio than the other combustion chamber, the piston within the combustion chamber and/or the piston rod having the smaller compression ratio may be heated to increase the compression ratio of the combustion chamber. Consequently, the compression ratio variance can be decreased. The piston heating system 12 may also be configured to deliver heat to the pistons 17 and 19 during low load and/or cold start conditions to further increase engine efficiency, in one example. A low load condition may be a condition where engine load is less than a threshold value and a cold start condition may be a condition where engine temperature is less than a threshold value. The engine load threshold pressure may be 10 bar brake mean effective pressure (BMEP), in one example. However, it will be appreciated that the engine load threshold may be dependent on the size and application of the engine. In another example, the low load conditions threshold may be approximately equal to the maximum BMEP the engine experience during a city or highway drive cycle, in one instance. It will also be appreciated that the engine load threshold may also be highly dependent on the vehicles transmission or axle ratios. The engine temperature threshold value, in one instance, may be equivalent to the engines coolant temperature where the controller changes operating modes at approximately 65° C., in one example. Alternatively, the engine temperature threshold value may be determined based on whether the exhaust manifold temperature or the catalyst out temperatures exceeds the catalyst's T80 temperature which is the temperature where the catalyst converts 80% of the NOx or total hydrocarbon emissions (THC) exhaust emissions.

The engine 10 additionally includes an engine cooling system 68 configured to remove heat from the engine 10 and specifically the cylinder block 22 and the cylinder head 24. The engine cooling system 68 includes an engine coolant jacket 70. The engine coolant jacket 70 is shown positioned in the cylinder head 24. However, it will be appreciated that in other examples, the cylinder block 22 may additionally or alternatively include a coolant jacket. Moreover, it will be appreciated that the engine coolant jacket 70 may include a plurality of passages directing coolant around high temperature areas in the engine such as the combustion chambers. The engine coolant jacket 70 includes an inlet 72 receiving coolant from a coolant pump 74 and an outlet 76 delivering coolant to a heat exchanger 78 (e.g., radiator) designed to remove heat from the coolant flowing therethrough. In this way, a coolant loop may be formed in the engine cooling system 68. Coolant lines 80 with valves 82 positioned in the coolant lines may also be included in the engine cooling system 68. However, in other examples, only one of the coolant lines 80 may include a valve. The coolant lines 80 may be configured to direct heated coolant through lubrication lines in the lubrication system to heat lubricant. In such an example, the engine coolant may be used to heat lubricant directed at the pistons, 17 and 19. Thus, the coolant lines 80 may be included in the piston assembly heaters, 62 and 64, in one example.

A fuel delivery system 84 is also shown in FIG. 1. The fuel delivery system 84 provides pressurized fuel to fuel injectors 86. In the illustrated example, the fuel injectors 86 are direct fuel injectors coupled to the first and second combustion chambers, 18 and 20, respectively. Additionally or alternatively, the fuel delivery system 84 may also include a port fuel injector designed to inject fuel upstream of the combustion chambers into the intake system 16. The fuel delivery system 84 includes a fuel tank 88 and a fuel pump 90 designed flow pressurized fuel to downstream components. The fuel delivery system 84 may include conventional components such as a high pressure fuel pump, check valves, return lines, etc., to enable fuel to be provided to the injectors at desired pressures.

An exhaust system 92 configured to manage exhaust gas from the combustion chambers, 18 and 20, is also included in the vehicle 14 depicted in FIG. 1. The exhaust system 92 includes the exhaust valve 44 and 46 designed to open and close to allow and inhibit exhaust gas flow to downstream components from the combustion chambers. The exhaust system 92 also includes exhaust runners 93 providing fluidic communication between an exhaust manifold 94 and the first and second combustion chambers 18 and 20. The exhaust system 92 also includes an emission control device 96 coupled to an exhaust conduit 98 downstream of the exhaust manifold 94. The emission control device 96 may include filters, catalysts, absorbers, etc., for reducing tailpipe emissions.

An exhaust gas recirculation (EGR) system 140 is also shown in FIG. 1. The EGR system 140 includes an EGR conduit 142 fluidically coupled to the intake system 16 and the exhaust system 92. Thus, the EGR system 140 may be designed to flow exhaust gas from the exhaust system 92 to the intake system 16. The EGR system 140 further includes an EGR valve 144 configured to adjust a flowrate of exhaust gas flowing through the EGR conduit 142. An EGR cooler 146 is also included in the EGR system 140. The EGR cooler 146 is configured to remove heat from exhaust gas flowing through the EGR conduit 142. For instance, the EGR cooler 146 may include coolant conduits circulating coolant near exhaust gas conduits. However, numerous EGR cooler designs have been contemplated.

During engine operation, the combustion chambers 18 and 20 typically undergoes a four stroke cycle including an intake stroke, compression stroke, expansion stroke, and exhaust stroke. During the intake stroke, generally, the exhaust valves close and intake valves open. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via compression, resulting in combustion. However, in other examples, spark from an ignition device may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC.

FIG. 1 also shows a controller 100 in the vehicle 14. Specifically, controller 100 is shown in FIG. 1 as a conventional microcomputer including: microprocessor unit 102, input/output ports 104, read-only memory 106, random access memory 108, keep alive memory 110, and a conventional data bus. Controller 100 is configured to receive various signals from sensors coupled to the engine 10. The sensors may include engine coolant temperature sensor 120, exhaust gas composition sensor 122, exhaust gas airflow sensor 123, an intake airflow sensor 124, combustion chamber temperature sensors 126, pressure transducers 128 coupled to the combustion chambers 18 and 20, engine speed sensor 130, knock sensor 132, etc. In other examples, the sensors may additionally include proximity sensors coupled to the combustion chambers 18 and 20. The pressure transducers and/or the proximity sensors may be used to ascertain the compression ratios of the associated combustion chamber. In other examples, proximity sensors may be used instead of pressure transducers. Additionally, the controller 100 is also configured to receive throttle position (TP) from a throttle position sensor 112 coupled to a pedal 114 actuated by an operator 116.

Additionally, the controller 100 may be configured to trigger one or more actuators and/or send commands to components. For instance, the controller 100 may trigger adjustment of the throttle 28, lubrication system 52, intake valve actuators 40 and 42, exhaust valve actuators 48 and 50, piston heating system 12, engine cooling system 68, EGR system 140, and/or fuel delivery system 84. Specifically, the controller 100 may be configured to send signals to the first piston assembly heater 62 and the second piston assembly heater 64 to adjust amounts of heat provided to the pistons. The controller 100 may also be configured to send control signals to the lubricant pump 56 to adjust a flowrate of heated lubricant provided to the pistons, in one example. Additionally, the controller 100 may be configured to send control signals to the valve 82 to vary the amount of coolant flow provided to the lubrication system 52. Furthermore, the controller 100 may be configured to send control signals to the fuel pump 90 and the fuel injectors 86 to control the amount and timing of fuel injection provided to the combustion chambers 18 and 20. The controller 100 may also be configured to send command signals to the EGR valve 144 and the EGR cooler 146, in one example.

Therefore, the controller 100 receives signals from the various sensors and employs the various actuators to adjust engine operation based on the received signals and instructions stored in memory (e.g., non-transitory memory) of the controller. Thus, it will be appreciated that the controller 100 may send and receive signals from the piston heating system 12.

For example, adjusting the first piston assembly heater may include adjusting a piston assembly heater actuator to adjust the piston assembly heater. In yet another example, adjusting the amount of heat delivered to the pistons via the piston assembly heaters, 62 and 64, may be empirically determined and stored in predetermined lookup tables and/or functions. For example, one table may correspond to determining an amount of piston heating delivered to a piston when there is a variance in combustion chamber compression ratios, one table may correspond to determining an amount of piston heating delivered to pistons in the engine based on changes in engine load. The tables may be indexed to engine operating conditions such as engine temperature and engine load, among other engine operating conditions. Furthermore, the tables may output an amount of fuel to inject via the fuel injectors to the combustion chambers at each cylinder cycle.

FIG. 2 shows a first example of an internal combustion engine 200 and piston heating system 202 in cross-section. A z-axis and x-axis are provided in FIG. 2 as well as FIG. 3, for reference. In one example, the z-axis may be parallel to a gravitational axis. However in other examples, other z-axis orientations have been contemplated. It will be appreciated that the engine 200 and the piston heating system 202, shown in FIG. 2, are examples of the engine 10 and the piston heating system 12 shown in FIG. 1. Therefore, features in the engine 10 and piston heating system 12 shown in FIG. 1 may be included in the engine 200 and piston heating system 202, shown in FIG. 2, or vice versa.

FIG. 2 shows the engine 200 including a cylinder block 204 coupled to a cylinder head 206 forming a combustion chamber 208. Although only one cylinder is depicted in FIG. 2, it will be appreciated that the engine 200 may include additional combustion chambers and piston heating system components similar to those depicted in FIG. 2. Thus, other combustion chambers in the engine may include similar piston assembly heaters, lubrication lines, etc. Additionally, an exhaust valve 210 and an intake valve 212 are shown coupled to the combustion chamber 208. Correspondingly, intake conduit 214 and exhaust conduit 216 providing fluidic communication between upstream intake system components and downstream exhaust system components, are also depicted in FIG. 2.

A piston 218 is positioned within the combustion chamber 208. The piston 218 include piston rings 220 designed to seal the combustion chamber 208. A piston rod 222 is attached to the piston 218 and a crankshaft 224. The piston 218 and piston rod 222 may be included in a piston assembly.

The piston heating system 202 includes a lubrication line 226 and a valve 228 coupled to the lubrication line. The valve 228 is configured to adjust an amount of lubricant flowed to the lubrication line 226. The valve 228 as well as other lubricant valves described herein may be an on/off electrically actuated solenoid valve, an on/off pneumatically actuated solenoid valve, an on/off electrically actuated piezoelectric stack valve, an electrically actuated proportioning valve, or a pneumatically actuated proportioning valve.

A nozzle 230 is positioned at the end of the lubrication line 226. The nozzle 230 is designed to direct lubricant spray towards an underside 232 of the piston 218. The piston heating system 202 also includes a piston assembly heater 234 coupled to the lubrication line 226. The piston assembly heater may be an electric heater, in one example. However, in other examples the piston assembly heater may receive heated coolant from the engine cooling system 68, shown in FIG. 1, to heat the lubricant flowing through the lubrication line 226. The piston heating system 202 may also include a lubricant conduit 236 and a valve 238 coupled to the lubricant conduit. The valve is configured to adjust an amount of lubricant flowed to lubrication lines 240. Nozzles 242 are positioned at the end of the lubrication lines 240. The nozzles 242 are designed to spray lubricant towards the piston rod 222. Another piston assembly heater 244 may be coupled to the lubrication lines 240. However in other examples, only one of the piston assembly heaters, 234 and 244, may be included in the piston heating system 202. Again the piston assembly heater 244 may be an electrical heater, in one example, or in other examples may receive heated coolant from the engine cooling system, as previously discussed. When the piston assembly heaters receive heated coolant from the engine cooling system the coolant flow to the heater may be varied to adjust the amount of heating provided by the piston assembly heater to the lubricant flowing therethrough.

A pressure sensor 246 (e.g., pressure transducer) is also shown in FIG. 2. The pressure sensor 246 extends through the cylinder head 206 into the combustion chamber 208. The pressure sensor 246 is configured to sense the pressure in the combustion chamber 208. A pressure signal from the pressure sensor 246 may be used to determine the combustion chamber's compression ratio. In other examples, the engine 200 may additionally or alternatively include a proximity sensor that senses the proximity of the piston to an upper portion of the cylinder head 206 to enable the compression ratio of the combustion chamber 208 to be determined. In such an example, the proximity sensor may extend through the cylinder head in a similar manner to the pressure sensor. A temperature sensor 248 is also shown extending through the cylinder block 204 into the combustion chamber 208. The temperature sensor 248 is configured to determine the temperature in the combustion chamber 208. The engine 200 also includes an engine speed sensor 250 coupled to the crankshaft 224 designed to sense the rotational speed of the crankshaft.

A direct fuel injector 252 is also shown coupled to the combustion chamber 208. However, a port fuel injector may additionally or alternatively be included in the engine. It will be appreciated that the valve 228, valve 238, piston assembly heater 234, and piston assembly heater 244 may receive control signals from the controller 100, shown in FIG. 1. Therefore, the amount of heat delivered to the lubricant flowing through the lubrication lines 226 and 240 as well as the flowrate of the lubricant traveling through the lubrication lines may be varied. Variation in lubricant heating and/or lubricant flowrate enables the heat delivered to the piston and/or piston rod to be varied to induce an adjustment in the compression ratio in the combustion chamber. For instance, when the piston is heated the axial length 253 of the piston increases, thereby reducing the compression ratio in the combustion chamber 208. In one example, the piston may be constructed out of a metal such as steel, aluminum, etc. The growth of the piston may be dependent on the thermal expansion coefficient, thermal conductivity, and heat transfer coefficient (e.g., conductive and/or convective heat transfer coefficient) of the piston. The thermal expansion coefficient and thermal conductivity are properties of the piston material and can vary along the height of the piston if the piston is not composed of a single material such as an assembly of smaller components with different materials (i.e., aluminum, steel, etc.,) or alloys. The heat transfer coefficient is a function of the pistons surface area, roughness, and material. In one example, the bottom of the piston could be roughened to increase surface area and increase convective heat transfer which would increase the sensitivity of the compression ratio to the cooling/heating jets and heaters. Furthermore, the cross sectional shape of the piston will affect the thermal gradients within the piston which will impact the sensitivity of the compression ratio to the cooling/heating jets and heaters.

FIG. 3 shows another example of an internal combustion engine 300 and piston heating system 302 in cross section. The engine 300 and the piston heating system 302 are examples of the engine 10 and the piston heating system 12 shown in FIG. 1. Therefore, features in the engine 10 and piston heating system 12 shown in FIG. 1 may be included in the engine 300 and piston heating system 302, shown in FIG. 3, or vice versa. Furthermore, the internal combustion engine 300 and piston heating system 302 may have similar features to the internal combustion engine 200 and piston heating system 202, shown in FIG. 2. Therefore, redundant description is omitted.

The engine 300 includes a cylinder block 304 coupled to a cylinder head 306 forming a combustion chamber 308. The engine 300 also includes a combustion chamber liner 310. Additionally, an exhaust valve 312 and an intake valve 314 are shown coupled to the combustion chamber 308. Correspondingly, an intake conduit 316 and an exhaust conduit 318 providing fluidic communication between upstream intake system components and downstream exhaust system components, are also depicted in FIG. 3.

The piston heating system 302 include an induction heater 320. The induction heater 320 may at least partially extend around a piston rod 322 coupled to a piston 324 positioned in the combustion chamber 308. In one example, the induction heater 320 may include an insulated wire that is repeatedly looped to form a ring commonly referred to as an induction coil. The inside diameter of the induction coil may be no smaller than the engines cylinders bore diameter, in some instances. Further in such an example, the induction coil may be attached to the bottom of the cylinder liner or bore such that the piston rod passes through the center of the induction coil. In one example, the induction coil may be wrapped around the liner. In another example, the induction coil may be imbedded in the block material. However, in these examples, the liner and engine block are typically constructed of metal and would therefore interfere with the induction heating of the piston rod. Continuing with the induction coil example, alternating current may be applied to the induction coil with an electrically conductive piece of metal positioned inside the induction coil. The alternating current in the induction coil generates eddy currents inside the electrically conductive piece of metal which heats the electrically conductive piece of metal. It will further be appreciated that the induction heater 320 may heat the piston rod 322 as the rod drops below the combustion chamber liner 310, in one example. In such an example, the induction heater 320 may not directly heat the piston but heat the piston rod that in turn heats the piston. Therefore, the induction heater 320 may be positioned vertically below the combustion chamber liner 310 to avoid directly heating the liner, in one example. However, other induction heater positions have been contemplated.

The piston rod 322 is also shown rotationally attached to a crankshaft 326. The induction heater 320 also extends through the combustion chamber liner 310. The induction heater 320 may be configured to heat the piston rod and/or piston via induction. The induction heater 320 may therefore include components such an electromagnet, an electronic oscillator, coils, etc., that enable eddy currents to be generated in the piston rod and/or piston to generate heat therein, as discussed above. Using induction heaters to heat the pistons has the benefit of heating the piston independent of lubrication system operation. Furthermore, induction heaters can provide targeted heating of the piston, to avoid unwanted heating of surrounding components, if desired.

An energy storage device 328 (e.g., battery, flywheel, capacitor, etc.,) is configured to provide energy to the induction heater 320. It will be appreciated that the energy storage device 328 may provide energy to other engine systems, in some examples. Further in some examples, the energy storage device 328 may be recharged via an alternator coupled to the crankshaft 326.

A lubrication line 330 is also depicted in FIG. 3. The lubrication line 330 includes a nozzle 332 positioned at one end. The nozzle 332 is configured to spray lubricant towards the piston rod 322. A valve 334 is also coupled to the lubrication line 330. The valve 334 is designed to enable adjustment in the flowrate of lubricant through the lubrication line. The valve 334, induction heater 320, and energy storage device 328 may receive control signals from the controller 100, shown in FIG. 1, to adjust operation of the components.

FIG. 3 also shows a direct fuel injector 336. A pressure sensor 338 (e.g., pressure transducer) is also shown in FIG. 3. The pressure sensor 338 extends through the cylinder head 306 into the combustion chamber 308. The pressure sensor 338 is configured to sense the pressure in the combustion chamber 308. A temperature sensor 340 is also shown extending through the cylinder block 304 into the combustion chamber 308. The temperature sensor 340 is configured to determine the temperature in the combustion chamber 308. The engine 300 also includes an engine speed sensor 342 coupled to the crankshaft 326 designed to sense the rotational speed of the crankshaft.

Additionally, in some examples, it will be appreciated that the engine 300 may include one set of pistons that have corresponding induction heaters, such as the induction heater shown in FIG. 3, and one set of pistons with corresponding lubrication line piston assembly heaters, such as the piston assembly heaters shown in FIG. 2.

FIG. 4 shows a method 400 for operation of an engine with a piston heating system. Method 400 as well as the other methods described herein may be implemented by engines and piston heating systems described above with regard to FIGS. 1-3 or may be implemented by other suitable engines and piston heating systems, in other examples.

Instructions for carrying out the method 400 and the other methods described herein may be executed by a controller based on instructions stored in memory (e.g., non-transitory) executable by the controller and in conjunction with signals received from sensors of in the engine and corresponding systems, such as the sensors described above with reference to FIGS. 1-3. The controller may employ engine actuators of the engine systems to adjust engine operation, according to the methods described below.

At 402 the method includes determining engine operating conditions. The engine operating conditions may include combustion chamber pressures, intake flowrate, engine temperature, exhaust gas flowrate, exhaust gas composition, engine speed, engine load, combustion chamber temperatures, piston position, etc.

Next at 404 the method includes determining if there is a deviation in compression ratios of multiple combustion chambers. Specifically in one example, it may be determined if the difference between a first compression ratio and a second compression ratio is greater than an acceptable value. In one example, the threshold value may be correlated to engine size, engine speed, and/or engine load. Further in one example, the threshold value may be strongly correlated to the coefficient of variation (COV) of indicated mean effective pressure (IMEP). In such an example, for a given speed and load point for an engine, the COV of mean effective pressure (MEP) can be calculated and used to calculate the cycle to cycle +/−3 sigma spread for each cylinder. Continuing with such an example, the maximum variation of MEP cylinder to cylinder due to compression ratio should not exceed the 3 sigma cycle to cycle 3 sigma spread. As a result, testing of different compression ratios may have to be conducted on the engine to quantify the effect of compression ratio on MEP at identical calibration and boundary condition settings. Based on these measurements, the maximum compression ratio variance may be calculated for the given engine, speed, and load. In one example, the equation 1, shown below, may be used to determine the compression ratio variance between combustion chamber.

$$\frac{\sigma_{MEP, cycle-cycle}(rpm, \text{load})}{\mu_{MEP, cycle-cycle}(rpm, \text{load})} > \frac{\sigma_{MEP, compresion\ Ratio}(rpm, \text{load})}{\mu_{MEP compersion\ Ratio}(rpm, \text{load})} \quad \text{(Equation 1)}$$

However, other suitable techniques for ascertaining compression ratio variance have been contemplated. The compression ratio in each of the combustion chambers may be determined based on signals from pressure sensors coupled to the combustion chambers, signals from proximity sensors coupled to the combustion chambers, and/or signals from temperature sensors coupled to the combustion chambers, in one example.

If it is determined that there is not a deviation between the compression ratios (NO at 404) the method advances to 406. At 406 the method includes maintaining engine operating parameters. Maintaining engine operating parameters may include sustaining shutdown of the piston assembly heaters and operating the lubrication system according to a predetermined control strategy.

On the other hand, if it is determined that there is a deviation between the compression ratios (YES at 404) the method advances to 408. At 408 the method includes operating a piston heating system to apply a targeted amount of heat to a piston assembly based on the compression ratio deviation, the piston assembly including at least a piston positioned within the combustion chamber. In another example, step 408 may include actively heating the first piston assembly including at least the first piston to decrease a torque imbalance between a first combustion chamber and a second combustion chamber, the first combustion chamber having the first piston positioned therein and the second combustion chamber having a second piston positioned therein. Further in one example, operating the piston heating system to apply the targeted amount of heat to the piston assembly may include operating a piston assembly heater to initiate piston and/or piston rod heating. Operation of the piston assembly heater may include sending electrical power to an electrical heater coupled to a lubrication line spraying lubricant towards a piston rod and/or an underside of the piston, in one example. In other examples, operation of the piston assembly heater may include sending electrical power to an induction heater designed to inductively heat the piston and/or piston rod. In another example, operation of the piston assembly heater may include increasing an amount of heated coolant provided to a piston assembly heater. In such an example, heat from the coolant flowing through the piston assembly heater is transferred to lubricant flowing through the piston assembly heater. As previously discussed the piston heating will increase the compression ratio in the corresponding combustion chamber. Further in one example, the piston may only be heated when the engine coolant temperature is below a threshold value. In one example, the threshold temperature may be determined based on a temperature used to indicate a transition from a catalyst light off mode to a standard operating mode. However, other techniques for determining the aforementioned threshold have been contemplated.

Next at 410 the method includes inhibiting heating of a second piston via the piston heating system, the second piston positioned in the second combustion chamber. For instance, activation of a second piston assembly heater designed to heat the second piston may be prevented. In other words, deactivation of the second piston assembly heater may be sustained. In this way, one piston assembly heater may be activated while the other is deactivated to enable the deviation between the compression ratios to be reduced. Consequently, a torque imbalance in the engine can be reduced, thereby reducing NVH in the engine. A reduction in torque imbalance also enables combustion efficiency to be increased. Further in other examples, an amount of heating of the second piston may be reduced rather than inhibited.

At 412 the method includes determining if there is an increase or decrease in engine load. If there is an increase in engine load the method advances to 414. At 414 the method includes operating the piston heating system to decrease the amount of heat provided to the pistons in the engine. Operating the piston heating system to decrease the amount of heat provided to the piston includes deactivating the first and second piston assembly heaters corresponding to the first and second combustion chambers, respectively. In other examples, an output of the piston assembly heaters for each of the combustion chambers may be decreased to decrease an amount of heat provided to the pistons via the piston heating system. Decreasing the compression ratios of the combustion chambers during high load conditions can increase combustion efficiency.

However, if there is a decrease in engine load the method advances to 416. At 416 the method includes operating the piston heating system to increase the amount of heat provided to the pistons in the engine. Operating the piston heating system to increase the amount of heat provided to the piston includes activating or increasing the heat output by the first and second piston assembly heaters corresponding to the first and second combustion chambers, respectively. Heating the pistons during a low load condition enables the compression ratios of the combustion chambers to be increased to increase combustion efficiency.

FIG. 5 shows another method 500 for operation of an engine with a piston heating system. As discussed above, the method may be implemented by the engines and piston heating systems described above with regard to FIGS. 1-3 or may be implemented by other suitable engines and piston heating systems.

At 502 the method includes determining engine operating conditions. The engine operating conditions may include combustion chamber pressures, intake flowrate, engine temperature, exhaust gas flowrate, exhaust gas composition, engine speed, engine load, combustion chamber temperatures, piston position, etc.

Next at 504 the method includes determining if there is a torque imbalance in the engine. The torque imbalance in the engine may be ascertained based on combustion chamber pressure signals, in one example. For instance, if the compression ratios in two combustion chamber vary by an amount greater than a threshold value it may be ascertained that there is a torque imbalance in the engine. The threshold value may be determined using the techniques described above with regard to FIG. 4, in one example. However, other strategies for determining if a torque imbalance is occurring have been contemplated. For instance, the torque imbalance may be determined based on a comparison between temperatures and/or pressures in the first combustion chamber and the second combustion chamber. Furthermore, it will be appreciated that during some conditions the engine may be operating with a torque imbalance and without a torque imbalance during other conditions.

If it is determined that there is not a torque imbalance in the engine (NO at 504) the method proceeds to 506. At 506 the method includes maintaining engine operating parameters. Maintaining engine operating parameters may include sustaining shutdown of the piston assembly heaters and operating the lubrication system according to a predetermined control strategy.

On the other hand if it is determined that there is a torque imbalance in the engine (YES at 504) the method advances to 508. At 508 the method includes operating a piston heating system to apply a targeted amount of heat to a piston assembly corresponding to the combustion chamber to decrease the torque imbalance. For instance, electric or induction heaters providing heating to the piston and/or piston rod may be powered to increase an amount of heat provided to a piston to increase the compression ratio of the combustion chamber in which the piston resides.

At 510 the method includes determining if a knock condition is occurring in the engine. A knock condition may include one or more engine operating conditions that generate knock such as engine temperature, engine speed, engine load, etc. Specifically in one example, signals from a knock sensor coupled to the engine may be used to determine if engine knock is occurring. For instance, if a signal indicating vibration from a knock sensor exceeds a threshold value it may be determined that knock is occurring. Furthermore, it will be appreciated that the engine may be operated with a knock condition. If a knock condition is not occurring in the engine (NO at 510) the method advances to 512. At 512 the method includes maintaining engine operating parameters. For instance, predetermined valve timing and or injection timing strategies may be maintained.

On the other hand, if it is determined that a knock conditions is occurring in the engine (YES at 510) the method proceeds to 514. At 514 the method includes adjusting engine operating parameters to reduce (e.g., stop or prevent) engine knock. Adjusting engine operating parameters to reduce (e.g., stop or prevent) engine knock may include retarding or advancing valve timing, retarding injection timing, and/or reducing an amount fuel injection. In this way, combustion efficiency in the engine can be increased through a reduction in engine knock. In one example, the EGR flowrate may be adjusted to reduce engine knock. For instance, a flowrate of cooled EGR gas may be increased when knock is detected. Such a knock control strategy, may be implemented in a compression ignition engine. In another example, in a spark ignition engine, the spark timing may be retarded to reduce (e.g., stop or prevent) knock. Continuing with the spark ignition example, spark timing may be advanced when the engine is below the knock limit to increase combustion efficiency. In another example, the temperature of the oil sprayed onto the piston assembly may be decreased to reduce (e.g., stop or prevent) knock. In another example, a pilot injection quantity may be increased to reduce (e.g., stop or prevent) knock. A pilot injection may be an injection event occurring prior to a primary fuel injection event. In yet another example, injection timing may be retarded to reduce (e.g., stop or prevent) knock. Further in some examples, a combination of the knock reduction strategies may be used in conjunction to stop or prevent knock. Next at 516 the method includes determining if the engine is below a threshold temperature. The threshold temperature may corresponding to a cold start threshold temperature (e.g., 80° C.). An engine temperature sensor may be used to determine the engine temperature, in one example. If it is determined that the engine is not below the threshold temperature (NO at 516) the method advances to 518. At 518 the method includes maintaining engine operating parameters, such as maintaining current piston heating strategies. However, if it is determined that the engine is below the threshold temperature (YES at 516) the method moves to 520. At 520 the method includes operating the piston heating system to increase an amount of heat applied to the pistons in the engine. For instance, amounts of heat generated by piston assembly heaters providing heat to the first and second pistons may be increased to decrease a cold start duration. Specifically, the piston heating system may be operated to increase an amount of heat delivered to the combustion chambers until the engine temperature surpasses the threshold temperature. Consequently, engine emissions are reduced.

Now turning to FIG. 6, graphs 600 depict example piston heating system control signals in conjunction with engine load and compression ratios of different combustion chambers plots, such as described in FIGS. 1-5. The example of FIG. 6 is drawn substantially to scale, even though each and every point is not labeled with numerical values. As such, relative differences in timings can be estimated by the drawing dimensions. However, other relative timings may be used, if desired. Furthermore, each of the curves and plots time is represented in the x axis.

Continuing with FIG. 6, curve 602 depicts the compression ratio of a first combustion chamber and curve 604 depicts the compression ratio of a second combustion chamber (along the y axis). Signal 606 indicates a control signal sent to a first piston assembly heater and signal 608 indicates a control signal sent to a second piston assembly heater. Curve 610 depicts the engine load in the engine (along the y axis). The control signals for the piston assembly heaters shown in FIG. 6 are intended for electrical heaters or induction heaters. However, it will be appreciated that in other examples, control signals may be sent to piston assembly heaters that utilized heated engine coolant to warm engine lubricant directed to pistons.

At t0, the compression ratio curves 602 and 604 have a variation 612 therebetween. Specifically, the compression ratio corresponding to the first combustion chamber is less than the compression ratio corresponding to the second combustion chamber. When such variation is recognized, the first piston assembly heater is turned on at t1. Turning on the first piston assembly heater generates piston heating. When the first piston is heated the compression ratio of the first combustion chamber is increased, to reduce the variance between the compression ratios. Once the compression ratios are substantially equivalent or within an acceptable range, the first piston assembly heater is turned off, as illustrated at t2. Therefore, when there is a deviation between compression ratios in different combustion chambers, a piston in the combustion chamber with the smaller compression ratio is heated to decrease the deviation between the compression ratios to decrease a torque imbalance in the engine. Consequently, NVH in the engine is reduced and engine efficiency is increased. Thus, the technical effect of heating a piston to reduce compression ratio variations is a reduction in NHV in the engine and an increase in combustion efficiency.

Additionally, the engine load curve 610 is above a threshold value 614 until it reaches t3. When the engine load decreases below the threshold value 614 both the first piston assembly heater and the second piston assembly heater are turned on. In this way, the compression ratio of the combustion chambers in the engine may be increased during low load conditions to increase engine efficiency.

Further in some examples, the piston assembly heaters may be designed to output a variable amount of heat such as in a stepwise or continuous manner. In such an example, the degree of piston assembly heater output may be determined based on the difference between the compression ratios of the combustion chambers, engine load (e.g., rate of change of engine load), engine temperature, etc. In this way, the degree of piston heating may be fine-tuned based on engine operating conditions. Moreover, it will be appreciated that the plots shown in FIG. 6 are exemplary in nature and that, in other examples, the compression ratios and piston heating system control scheme may differ.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a method for operation of an engine is provided. The method includes determining a variation between compression ratios in a first combustion chamber and a second combustion chamber and operating a piston heating system to apply a targeted amount of heat to a first piston assembly based on the variation between the compression ratios, the first piston assembly including at least a first piston positioned within the first combustion chamber.

In another aspect, an internal combustion engine is provided. The internal combustion engine includes a first combustion chamber with a first piston positioned therein, the first piston coupled to a crankshaft via a first piston rod, a second combustion chamber with a second piston positioned therein, the second piston coupled to the crankshaft via a second piston rod, a piston heating system including a first heating device designed to provide heat to the first piston and a second heating device designed to provide heat to the second piston, and a controller including code stored in non-transitory memory executable by a processor to: determine a variation between compression ratios of the first combustion chamber and the second combustion chamber, and operate the piston heating system to apply a targeted amount heat to at least one of the first piston, the first piston rod, the second piston, and the second piston rod based on the variation between the compression ratios.

In another aspect a method for operation of an engine system is provided. The method includes actively heating a first piston assembly including at least a first piston to decrease a torque imbalance between a first combustion chamber and a second combustion chamber, the first combustion chamber having the first piston positioned therein and the second combustion chamber having a second piston positioned therein.

In any of the aspects herein or combinations of the aspects, operating the piston heating system may include activating a heater coupled to a lubrication line, the lubrication line including a nozzle directing lubricant to a first piston rod coupled to the first piston and a crankshaft during engine operation.

In any of the aspects herein or combinations of the aspects, operating the piston heating system may include activating a heater coupled to a lubrication line, the lubrication line including a nozzle directing lubricant to an underside of the first piston during engine operation.

In any of the aspects herein or combinations of the aspects, operating the piston heating system may include activating an induction heater coupled a section of a cylinder block adjacent to the first piston.

In any of the aspects herein or combinations of the aspects, the method may further include inhibiting heating of a second piston assembly based on the variation between the compression ratios, the second piston assembly including at least a second piston positioned in the second combustion chamber.

In any of the aspects herein or combinations of the aspects, the method may further include in response to identifying a knock condition, increasing a pilot injection quantity into at least one of the first combustion chamber and the second combustion chamber to reduce knock. In any of the aspects herein or combinations of the aspects, the method may further include in response to identifying a knock condition, increasing a flowrate of cooled exhaust gas recirculation in the engine to reduce knock.

In any of the aspects herein or combinations of the aspects, the variation between the compression ratios may be determined based on at least one of combustion chamber pressures and combustion chamber temperatures.

In any of the aspects herein or combinations of the aspects, the first heating device may be a heater coupled to a lubrication line.

In any of the aspects herein or combinations of the aspects, the lubrication line may include a nozzle directing lubricant to the first piston rod coupled to the first piston and the crankshaft during engine operation.

In any of the aspects herein or combinations of the aspects, the first heating device may be an induction heater coupled to a portion of a cylinder block adjacent to the first piston.

In any of the aspects herein or combinations of the aspects, the internal combustion engine may be configured to implement compression ignition in the first combustion chamber and the second combustion chamber.

In any of the aspects herein or combinations of the aspects, the first piston may be included in a first cylinder bank and the second piston is included in a second cylinder bank.

In any of the aspects herein or combinations of the aspects, the method may further include determining a knock condition in the combustion chamber and in response to determining the knock condition, advancing spark timing in the first combustion chamber to prevent knock.

In any of the aspects herein or combinations of the aspects, the torque imbalance may be determined based on a comparison between at least one of temperatures and pressures in the first combustion chamber and the second combustion chamber.

In any of the aspects herein or combinations of the aspects, the method may further include inhibiting heating of a second piston assembly based on the torque imbalance, the second piston assembly including at least the second piston.

In any of the aspects herein or combinations of the aspects, heating the first piston assembly may include actuating a heater coupled to a lubrication line with a nozzle jetting lubricant at a first piston rod coupled to the first piston.

In any of the aspects herein or combinations of the aspects, heating the first piston assembly may include actuating a heater coupled to a lubrication line with a nozzle jetting lubricant at an underside of the first piston.

In any of the aspects herein or combinations of the aspects, the method may further include adjusting an amount of active heating of the first piston and actively heating the second piston based on a change in engine load.

In any of the aspects herein or combinations of the aspects, the torque imbalance may be determined based on a comparison between temperatures in the first combustion chamber and the second combustion chamber.

In any of the aspects herein or combinations of the aspects, the method may further include increasing the amount of heat delivered to the combustion chambers by the piston heating system during a low load to increase the compression ratios of the combustion chambers.

In any of the aspects herein or combinations of the aspects, the method may further include decreasing an amount of heat delivered to the combustion chambers during a high load condition to decrease the compression ratios of the combustion chambers.

In any of the aspects or combinations of the aspects, the method may further include increasing an amount of heat delivered to the combustion chambers when the engine is below a threshold temperature.

In any of the aspects or combinations of the aspects, the first piston assembly may include a first piston rod.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of an engine, comprising:
   determining a variation between compression ratios in a first combustion chamber and a second combustion chamber; and
   operating a piston heating system to apply a targeted amount of heat to a first piston assembly based on the variation between the compression ratios, the first piston assembly including at least a first piston positioned within the first combustion chamber.

2. The method of claim 1, where operating the piston heating system includes activating a heater coupled to a lubrication line, the lubrication line including a nozzle directing lubricant to a first piston rod coupled to the first piston and a crankshaft during engine operation.

3. The method of claim 1, where operating the piston heating system includes activating a heater coupled to a lubrication line, the lubrication line including a nozzle directing lubricant to an underside of the first piston during engine operation.

4. The method of claim 1, where operating the piston heating system includes activating an induction heater coupled a section of a cylinder block adjacent to the first piston.

5. The method of claim 1, further comprising inhibiting heating of a second piston assembly based on the variation between the compression ratios, the second piston assembly including at least a second piston positioned in the second combustion chamber.

6. The method of claim 1, further comprising in response to identifying a knock condition, increasing a pilot injection quantity into at least one of the first combustion chamber and the second combustion chamber to reduce knock.

7. The method of claim 1, where the variation between the compression ratios is determined based on at least one of combustion chamber pressures and combustion chamber temperatures.

8. The method of claim 1, where the first piston assembly includes a first piston rod.

9. An internal combustion engine comprising:
   a first combustion chamber with a first piston positioned therein, the first piston coupled to a crankshaft via a first piston rod;
   a second combustion chamber with a second piston positioned therein, the second piston coupled to the crankshaft via a second piston rod;
   a piston heating system including a first heating device designed to provide heat to the first piston and a second heating device designed to provide heat to the second piston; and
   a controller including code stored in non-transitory memory executable by a processor to:
   determine a variation between compression ratios of the first combustion chamber and the second combustion chamber; and
   operate the piston heating system to apply a targeted amount heat to at least one of the first piston, the first piston rod, the second piston, and the second piston rod based on the variation between the compression ratios.

10. The internal combustion engine of claim 9, where the first heating device is a heater coupled to a lubrication line.

11. The internal combustion engine of claim 10, where the lubrication line includes a nozzle directing lubricant to the first piston rod coupled to the first piston and the crankshaft during engine operation.

12. The internal combustion engine of claim 9, where the first heating device is an induction heater coupled to a portion of a cylinder block adjacent to the first piston.

13. A method for operation of an engine system, comprising:
actively heating a first piston assembly including at least a first piston to decrease a torque imbalance between a first combustion chamber and a second combustion chamber, the first combustion chamber having the first piston positioned therein and the second combustion chamber having a second piston positioned therein.

14. The method of claim 13, further comprising determining a knock condition in the combustion chamber and in response to determining the knock condition, advancing spark timing in the first combustion chamber to prevent knock.

15. The method of claim 13, where the torque imbalance is determined based on a comparison between at least one of temperatures and pressures in the first combustion chamber and the second combustion chamber.

16. The method of claim 13, further comprising inhibiting heating of a second piston assembly based on the torque imbalance, the second piston assembly including at least the second piston.

17. The method of claim 13, where heating the first piston assembly includes actuating a heater coupled to a lubrication line with a nozzle jetting lubricant at a first piston rod coupled to the first piston.

18. The method of claim 13, where heating the first piston assembly includes actuating a heater coupled to a lubrication line with a nozzle jetting lubricant at an underside of the first piston.

19. The method of claim 13, further comprising adjusting an amount of active heating of the first piston and actively heating the second piston based on a change in engine load.

20. The method of claim 13, where the first piston assembly includes a first piston rod.

* * * * *